March 9, 1971 W. G. HILL 3,568,352
FISHING DEVICE

Filed June 27, 1969 4 Sheets-Sheet 1

INVENTOR
Wilmot George Hill.
BY
Browdy & Neimark
ATTORNEYS

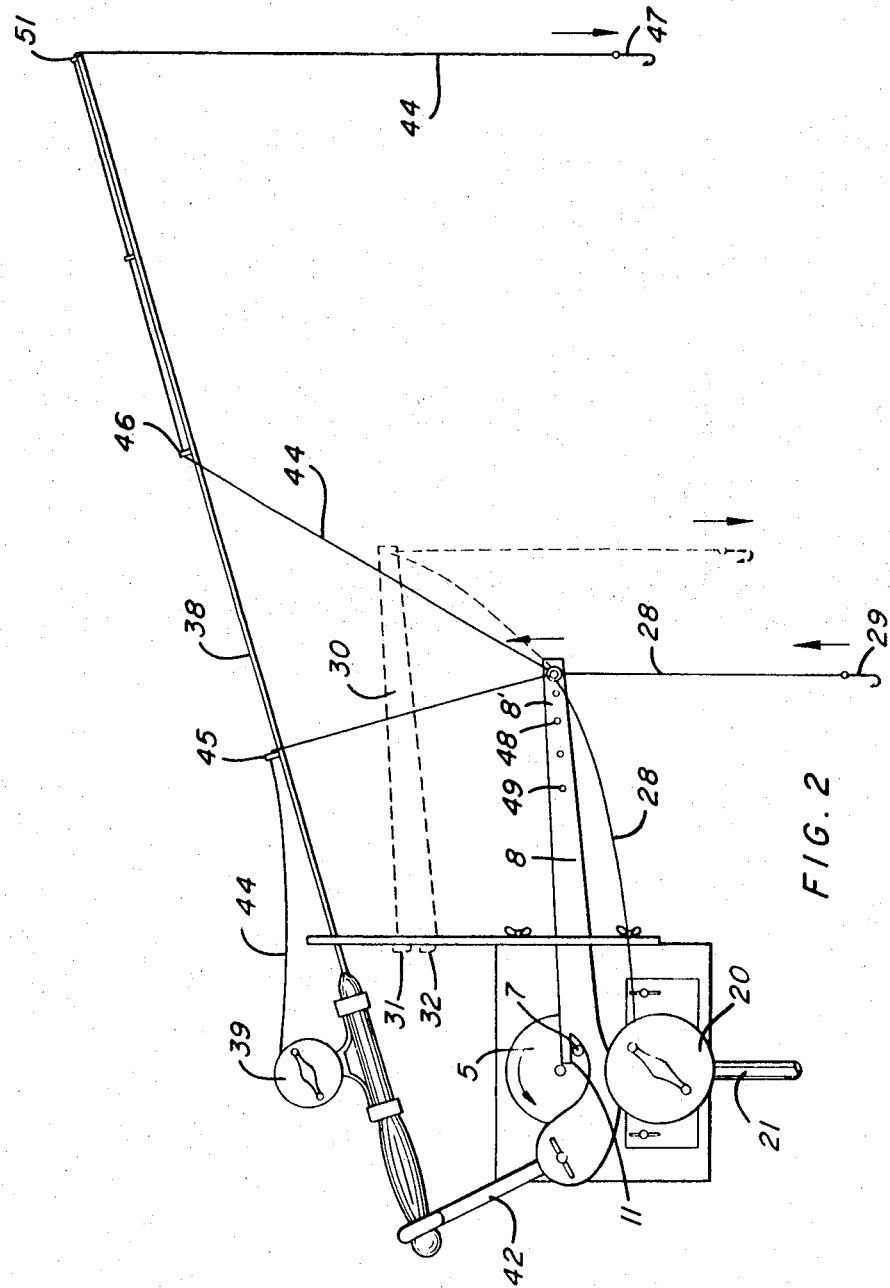

March 9, 1971  W. G. HILL  3,568,352
FISHING DEVICE

Filed June 27, 1969  4 Sheets-Sheet 3

INVENTOR
Wilmot George Hill.
BY
Browdy Neimark
ATTORNEYS

March 9, 1971  W. G. HILL  3,568,352

FISHING DEVICE

Filed June 27, 1969  4 Sheets-Sheet 4

INVENTOR
Wilmot George Hill
BY
Brady & Neimark
ATTORNEYS

United States Patent Office 3,568,352
Patented Mar. 9, 1971

3,568,352
FISHING DEVICE
Wilmot George Hill, 269 Raglan St. S.,
Renfrew, Ontario, Canada
Filed June 27, 1969, Ser. No. 837,193
Claims priority, application Canada, Nov. 29, 1968,
36,526
Int. Cl. A01k 97/12
U.S. Cl. 43—17     11 Claims

ABSTRACT OF THE DISCLOSURE

A device for automatically playing one or more fishing lines comprising a rotating member driven by a motor in a casing with the rotating member having a pin thereon, and an arm pivotally secured at one end to the casing and having a cam surface engageable by the pin so as to move the arm in a vertical plane. The casing is mounted on a support and has a reel secured thereto with a line extending to releasable securing means on the free end of the arm and thence into the water. The movement of the arm imparts a jigging movement to the line. Brackets may be added to the casing to hold a fishing pole carrying a fishing reel, and an additional detachable arm may project from the device to which the fishing line may be removably secured to impart various and selectable movements to the fishing line. A signal flag is secured to the device and associated with the fishing line in a manner to indicate the bite of a fish.

---

The present invention relates to a fishing device, and particularly to a device for automatically playing one or more fishing lines.

It is well known that fish are more attracted to a baited hook or lure when still fishing, or to a fishing spoon or lure when trolling, if movement is imparted to the fishing line. When fishing with rod and reel or with a drop line the playing of the line can be done manually, but this can become tiresome, and moreover if one person is using two or more lines it is not possible to manually play both lines effectively, especially if the lines are positioned some distance apart.

The present invention provides a device to automatically play one or more fishing lines in a manner attractive to fish without constant effort by the fisherman.

Moreover, the present invention provides means for selectively controlling the action imparted to one or more fishing lines. In one embodiment, a fishing line receives a slow "up" and quick "down" movement in the water, whereas in a second embodiment, the line may receive a quick "up" and slow "down" movement, the particular movement chosen being determined by what action appears to be most attractive to fish on any particular day and the type of line or bait being used. In addition as provision is made for one, two or more fishing lines to be played by a single device, one particular movement can be imparted to one line and an altogether different movement imparted to a second or third line, or all lines can receive the same movement.

The principal object of the invention then is to provide a device for automatically playing one or more fishing lines.

A further objective is to provide an automatic fishing line playing device including means enabling selection of a particular and different playing movement to one or more fishing lines.

A still further objective is to provide an automatic fishing line playing device which will play one or more fishing lines in the same or differing selected movements, and which is strong and durable in construction and inexpensive in operation.

Another object is to provide a device which will play one or more fishing lines during either still fishing or trolling, and which is provided with signal means to indicate when a fish has taken the bait.

These and other objects will become apparent from the following description.

The invention will now be more specifically defined with reference to the accompanying drawings wherein:

FIG. 2 illustrates a further embodiment of the device of FIG. 1 in side view;

In the following description of the drawings like reference numerals denote like component parts.

Figure 1:
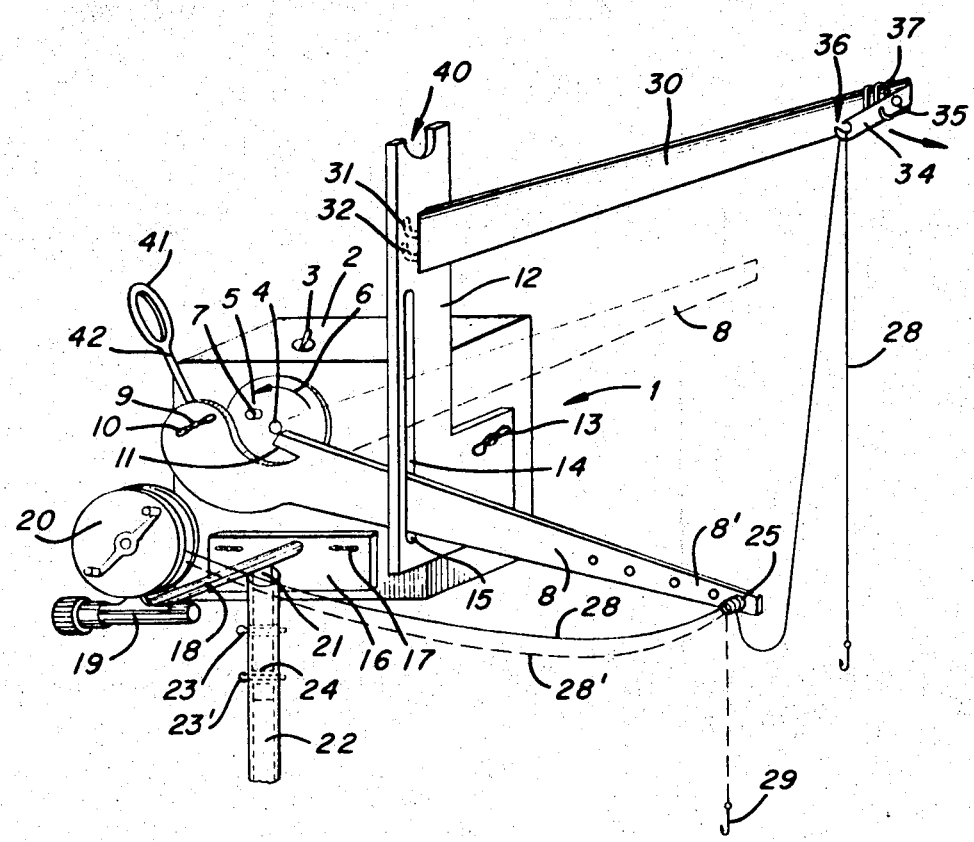
FIG. 1 illustrates in perspective view the automatic fishing device or fishing line playing apparatus according to the invention.

In FIG. 1 the device is indicated generally by numeral 1. Numeral 2 a housing or casing for a motor (not shown). The motor is preferably an electric direct current motor driven by a number of dry cell or chargeable dry cell batteries also provided within the casing. Alternatively, the motor may be provided with contacts (not shown) for connection to a 6 or 12 volt direct-current fluid-cell marine battery.

An off-on switch for the motor is provided at 3. A drive shaft 4 driven by the motor through a series of reduction gears (not shown) projects outwardly through the casing 2 and a rotating member 5 is secured to the outer end of the drive shaft. In the drawings the rotating member 5 is shown as a drive disc but other configurations such as a bell-crank lever type are possible. In FIG. 1, the drive shaft 4 and rotating member 5 rotate counterclockwise in the direction of arrow 6. In a preferred construction, the rotating member or drive disc is tapped to threaded engagement with the shaft 4. Of course with the drive disc rotating counter-clockwise, the shaft and disc threading will be clockwise or right-hand to prevent unthreading of the drive disc from the shaft during rotation.

In a preferred construction the shaft and disc will rotate once every 10 to 15 seconds or at about 4 to 6 revolution per minutes, but this rate can of course be varied by changing the ratio of the reduction gears without departing from the scope of the invention.

The casing 2 may be constructed with suitable removable panels to facilitate access to the reduction gears if a change in speed of rotation is desired, and to provide quick access to the batteries.

The drive disc 5 is provided with an outwardly-projecting drive pin or stud 7, the purpose of which will be described below.

One end of a pivot arm 8 is pivotally secured to a stud or shaft 9 projecting outwardly from the casing. The outer end of the shaft 9 is threaded to receive wing- or thumb-nut 10. The pivot arm 8 is shaped to provide a cam surface or tongue 11 which projects inwardly with respect to the center of the drive disc 5.

During rotation of the drive disc 5, the drive pin 7 contacts the lower surface of the cam tongue 11, and will pivot the pivot the pivot arm 8 from the position shown in full lines in FIG. 1 slowly upwardly to the position shown in broken lines. As the drive disc 5 rotates and pivots the pivot arm 8 upwardly, the drive pin 7 will move past the end of cam tongue 11, and due to gravity, the pivot arm 8 will pivot or fall back to the position shown in full lines in FIG. 1.

A raising and falling of the pivot arm 8 will occur once during each full rotation of the drive disc 5 as will clearly be understood.

In order to maintain the pivot arm 8 closely adjacent the drive disc 5 where the cam tongue 11 will be contacted by the drive pin 7, a slotted guide bar 12 is secured to the casing by means of thumb-nuts 13. The guide bar is provided with a vertical slot 14 through which the pivot arm 8 projects.

In order to minimize the impact of the pivot arm 8 against the lower end of the slot 14 during the falling movement of the pivot arm, a piece of resilient material, such as soft rubber, may be provided at 15.

The motor casing may be supported by a support plate 16, secured thereto by wing-nuts 17. A horizontal bar 18 extends outwardly from the plate 16 and carries a cross-bar 19 to which a fishing reel 20 (which may be of the conventional or spinning type) is secured in conventional fashion.

A short bar 21 projects downwardly from the horizontal bar 18 to provide means to mount the device on a suitable support.

The short bar 21 may be dimensioned to be received in an oar-lock of a boat or also may be received in a vertical tubular shaft 22, a portion of which is shown in FIG. 1. The shaft 22 and short bar 21 may be drilled to receive a locking pin 23 to prevent both removal and rotation of the bar 21 with respect to the tubular shaft 22. In addition, the shaft 22 may be drilled and the short bar provided with a circumferential groove 24 to accommodate a pin 23'. With this latter arrangement the short bar 21 may rotate with respect to the shaft 22 but may not be removed therefrom.

The two pins 23 and 23' will not be used together and in fact only one pin is actually required. For still fishing from a boat, raft, dock or when ice-fishing, the pin will occupy the position shown at 23', to enable rotation of the device, whereas when the device is used during trolling the pin position shown at 23 is employed.

Figure 3:
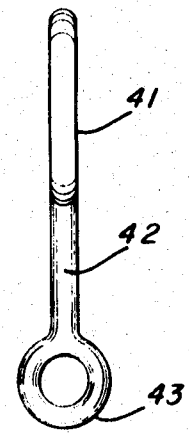
FIG. 3 illustrates in enlarged side view a component part of the device shown in FIGS. 1 and 2.

At or near the outer end 8' of the pivot arm 8, means for detachably securing a fishing line is provided. In the embodiment shown in the drawings this line securing means comprises a cylindrical or cone-shaped tightly coiled spring 25 fixed to the guide arm by any suitable means, such as by plate 26 and screw 27 (see FIG. 3) engaging a tapped hole in the arm.

The purpose of the spring 25 on the arm 8 is to hold a fishing line and enable the vertical reciprocating movement of the pivot arm 8 to impart movement to the line and bait and attract fish. Once a fish has taken the bait, however, the line pulls clear of the spring 25 so that the arm 8 will not be subjected to the pull of the fish on the line and possible damage, and the whole pull on the line will be taken by the reel 20.

This is accomplished simply by opening two coils of the spring 25 and inserting a doubled portion of a fishing line 28 therebetween. This is clearly shown in FIG. 3. The spring will hold the line during movement of the arm, but of course the line 28 will pull free when the bait on the line is taken by a fish.

In the simplest form of the invention, the fishing line 28' (shown in broken lines in FIG. 1) extends from the reel 20 to the spring 25 and downwardly into the water. The motor is then started and the drive pin 7 on drive disc 5 imparts the reciprocal movement to the pivot arm 8 and hence to the line 28' and hook 29 and bait (not shown). With this arrangement the hook 29 will be slowly raised in the water as the end 8' of the guide arm raises and then dropped as the arm drops in a movement attractive to fish.

A further embodiment is also shown in FIG. 1, and this comprises a stationary arm 30 secured to the guide bar 12 and projecting outwardly therefrom. The stationary arm 30 is detachably mounted on the guide bar to provide for quick disassembly and ease in transport of the device. The detachable mounting may be accomplished by providing the guide bar with two square apertures (not numbered in the drawings) to receive a hook 31 and tab 32 provided on the stationary arm (see FIGS. 1 and 2). As will be understood the hook 31 is first inserted into the uppermost aperture on the guide arm and then the tab 32 is positioned in the lowermost aperture.

The outermost end of the stationary arm is provided with an arm 34 pivotally attached thereto by pivot pin 35. The arm 34 is provided with an open line guide or open loop 36, and is held in substantially horizontal position by spring 37.

The purpose of the stationary arm is to provide line guiding means through which the fishing line 28 will pass, and by its use a completely reversed action of the line to that of the pivot arm 8 as used above is provided.

The arm 34 is mounted for pivotal movement downwardly against the action of spring 37 to enable the line 28 to disengage from open guide loop 36 when the bait is taken by a fish. As in the case of pivot arm 8 the freeing of the line from stationary arm 30 prevents any stress or damage to the two arms when a fish strikes and pulls the line.

By running the fishing line 28 from the reel 20 to the spring 25 and then to the line loop 36, the movement of the pivot arm 8 imparts a "jigging" action to the hook and bait. That is, an upward movement of the pivot arm 8 results in a lowering of the hook in the water, with the falling of the pivot arm imparting a quick upward movement (jigging) to the hook in a manner most favored by fishermen.

Thus in the embodiment of the invention shown in FIG. 1, two separate and distinct actions of the bait may be obtained as desired as follows:

(1) By running the fishing line 28' from the reel to the spring 25 and then to the water a slow "up" and quick "down" playing movement of the bait is obtained.

(2) By running the fishing line 28 from the reel to the spring 25 and through the loop guide 36 and then to the water a slow "down" and quick "up" (jigging) movement is imparted to the bait.

In FIG. 1, provision for only one fishing reel 20 is shown. Of course, two reels could be mounted on the device with one of the fishing lines arranged as (1) above and the other line as (2) without departing from the scope of the invention.

In addition, the provision of the stationary arm 30 being detachable, and the provision of wing-nuts 17 and pins 23 and 23' enables the structure to be quickly and easily assembled and disassembled for transport.

Figure 4:
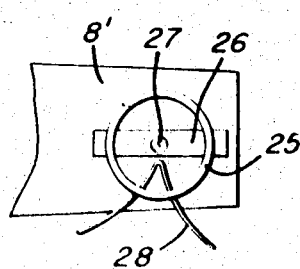
FIG. 4 illustrates in enlarged side view a component part of the device shown in FIGS. 1 and 2.

A further embodiment is shown in FIG. 2 which illustrates the positioning of a fishing rod 38 and reel 39 (either conventional or spinning) on the device. The fishing rod 38 is held on the device by means of the cradle or U-shaped upper end 40 (see FIG. 1) of the guide bar 12, and a loop 41 formed in the upper end of a support bar 42 fixed to the device. The support bar is shown in FIG. 4, and it is provided with a second loop 43 adapted to fit on stud 9 beneath the pivot arm 8. However, the fishing rod supporting means can be provided by other means without departing from the scope of the invention.

Any such mounting should, however, enable the rod to be quickly removed from the device when a fish bites to enable the rod to be handled in the usual manner.

When using the device in conjunction with the fishing rod 38 and reel 39, the fishing line 44 from the reel 39 is preferably secured to the spring 25 on pivot arm 8 between two line guides 45 and 46 of the rod. Thus, when the device is operating, the hook 47 on line 44 will receive a slow "down" or quick "up" or jigging movement.

In addition to the line from reel 39, the device in FIG. 2 can be used simultaneously with the line 28 from reel 20. This latter line can depend from spring 25 or from arm 30 as described with reference to FIG. 1 above. As stationary arm 30 need not be mounted for a satisfactory operation of the embodiment shown in FIG. 2, the arm 30 is shown in broken lines.

With reference to FIGS. 1 and 2, due to the pivotal mounting of the pivot arm 8, the length of the arc described by the end 8' of the arm will of course be greater than the arc described by any point between the two ends of the arm. To be able to regulate the actual length of movement of a fishing line during one complete cycle of the pivot arm provision is made to enable the spring 25 to be positioned at various points along the arm. These points are shown at, for example, 48 and 49 in FIGS. 1 and 2 which are tapped holes to receive the spring-securing screw 27 (see FIG. 3). As will be understood, the length of movement of the line and hook in the water will be somewhat less when the spring is positioned at point 49 than when the spring 25 is positioned at the end of the pivot arm as shown in FIGS. 1 and 2. Alternatively, the spring 25 could be mounted to be slideable along pivot arm 8 to any desired position.

The device of the invention should be mounted upright on any suitable supporting stand for still fishing through ice, or from a boat, raft or dock. To be more effective in playing a fishing line when trolling, however, the device is positioned on its side or back in the manner shown in FIG. 5, with arrow 50 indicating the direction of travel of the boat. When trolling, it is preferred to use only the line 28 from reel 20 as shown in FIG. 5, although the mounting of the rod 38 and reel 39 is also possible.

Figure 5:
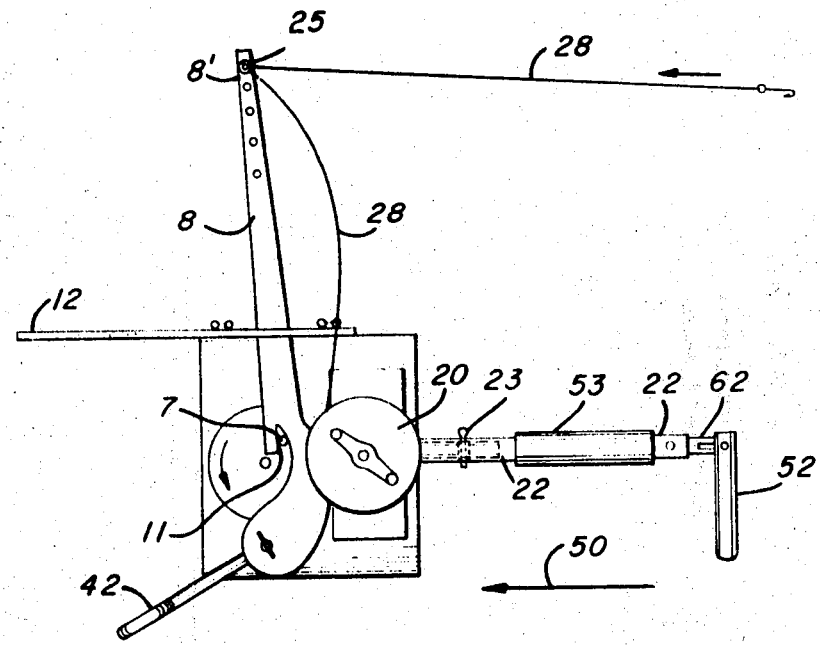
FIG. 5 illustrates in side view the device tilted at 90° for use as a fishing line playing device when trolling.

With the device positioned as in FIG. 5, gravity will have no effect on pivot arm 8, but when trolling, the pull of the line (attached to spring 25) in the water will move the end 8' of arm 8 to the rear of the boat or to the right when viewed in FIG. 5, and the action of drive pin 7 on cam tongue 11 will impart the necessary reciprocal action to the pivot arm 8 and line 28.

When a rod and reel are mounted for trolling, the fishing line will be secured to the spring 25 after the line leaves the end line guide 51 (FIG. 2) of the rod and not from between guides 45 and 46 as in FIG. 2.

Figure 6:
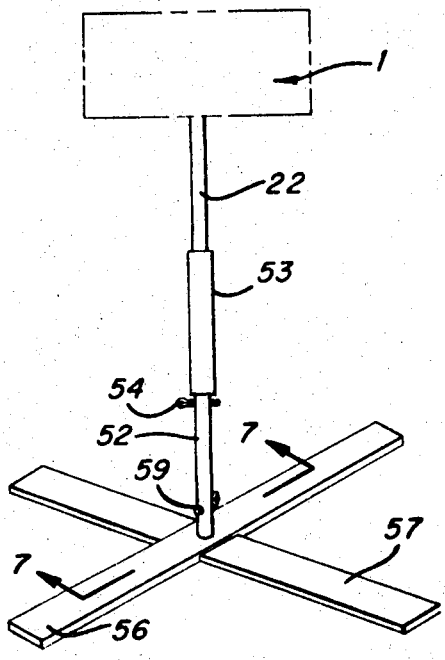
FIG. 6 illustrates in perspective view a suitable support stand for the device of the invention.
Figure 7:
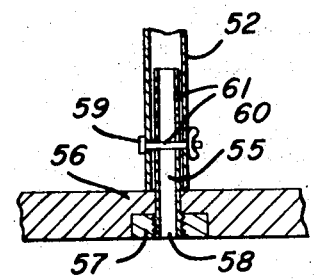
FIG. 7 is an enlarged sectional view along line 7—7 of FIG. 6.
Figures 8, 10, 11:
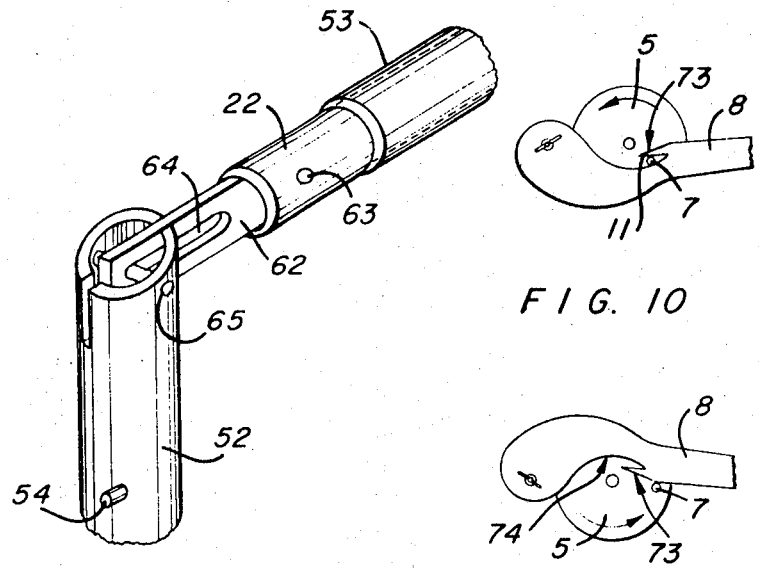
FIG. 8 is an enlarged perspective view of the elbow arrangement forming part of the stand structure shown in FIG. 6.
FIGS. 10 and 11 illustrate in side view a portion of the device illustrated in FIGS. 1, 2, 5 and 9 showing a modification of the pivot arm assembly.

A suitable stand for supporting the device both during still fishing and trolling is shown in FIGS. 6, 7 and 8.

In FIG. 6, the fishing device is shown generally by 1, in the upright position as shown in FIGS. 1 and 2 for still and ice-fishing. The support consists of an upper tubular member 22 (see also FIG. 1) and a lower tubular member 52 maintained in aligned relationship by sleeve member 53. The sleeve member is slideable over both the upper and lower tubular members and is maintained in the position shown in FIG. 6 by pin 54 which is provided in member 52 (see also FIG. 8).

The lower end of the tubular member 52 is provided with an insert bar 55 (see FIG. 7) to secure the member 52 to the two cross members 56 and 57. The cross members are centrally notched to fit together in flush fashion, as shown in FIG. 7. Holes are provided in both the cross members to receive the insert bar 55, with the hole in member 57 being tapped to threadedly receive the threaded end 58 of bar 55. The bar simply projects through a slightly larger hole provided in member 56.

The insert bar 55 is held in tubular member 52 by bolt 59 (with wing- and or thumb-out 60) passing through one of a series of holes 61 provided in the bar 55.

The series of holes 61 in the bar 55 provides means for lengthening the bar 55 projecting from the member 52. The shorter length shown in FIG. 7 provides for tightening of the various members 52, 55, 56 and 57 together to provide a solid stand, but by lengthening the bar 55 projecting from member 52 by selecting another of the holes 61 to receive bolt 59, the bar 55 may be positioned in an oar-lock of a boat for support rather than by using cross members 56 and 57.

The supporting stand shown in FIGS. 6, 7 and 8 also provides means for tilting the fishing device to the position shown in FIG. 5 for trolling. This is accomplished by pivoting the two tubular members 22 and 52 in a manner such as shown in FIG. 8. The tubular member 22 is provided with a projecting member 62 secured thereto by rivet 63 or the like. The member 62 is slotted at 64 and a rivet 65 or the like provided in tubular member 52 passes through the slot 64 to enable the two tubular members 22 and 52 to assume the right-angle position shown in FIGS. 5 and 8.

When the tubular members 22 and 52 are in axial alignment as in FIG. 6, the sleeve 53 prevents folding of the two tubular members but by simply sliding the sleeve 53 up on member 22 past the end of member 52 the support can be folded to the trolling position.

When the fishing device is in the still fishing position as shown in FIGS. 1, 2 and 6, pin 23' (FIG. 1) may be used to enable rotation of the device on the stand for convenience, but when the device is in trolling position as in FIG. 5 pin 23 should be used to prevent both rotation of the device with respect to tubular member 22 and also withdrawal therefrom.

The device may also be provided with means to indicate when a fish has taken the bait. Such an indicator may consist of a bell or light powered by the batteries driving the motor and triggered by a suitable switch activated by tension in the fishing line, or may simply consist of a suitable flag arrangement such as that shown in FIG. 9.

Figure 9:
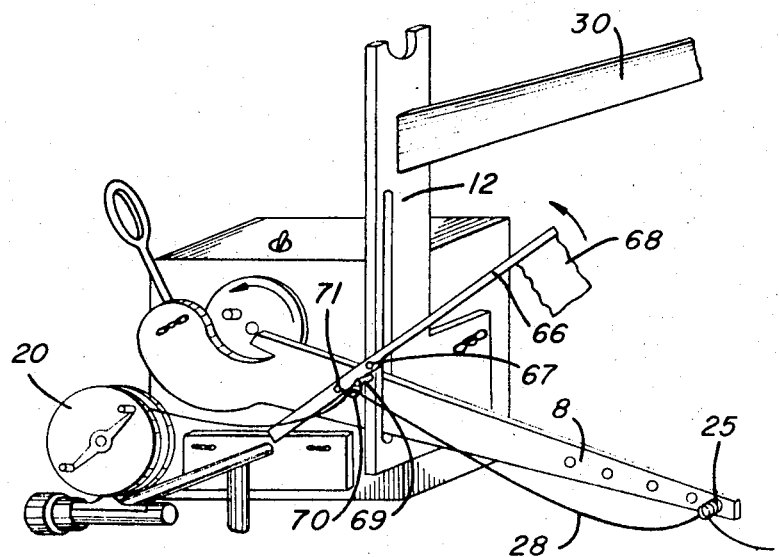
FIG. 9 illustrates the device of FIG. 1 in perspective view, and having a flag staff positioned thereon to indicate when a fish has taken the bait.

In this drawing, a suitable flag staff shown at 66 is pivotally secured by pin 67 to the side of the guide bar 12. One end of the staff is provided with a flag 68 and the other end is weighted to pivot the staff to a vertical position unless constrained against doing so. Such a constraint may be provided by a pin 69 loosely fitted into a hole (not numbered) provided in the guide bar 12 to hold the staff 66 in a more or less oblique angle as shown in FIG. 9. The end of the pin is provided with a short length of flexible cord 70 or the like which is also secured to the staff at 71. The fishing line 28 running from the reel 20 to the line securing means on the pivot arm 8 passes through the loop formed by the cord 70, and upon application of tension to the line, such as when a fish takes the bait, the line tightens and pulls the pin 69 from the hole in guide arm 8, enabling the staff to pivot to a vertical position indicating that a strike has been made.

Referring to FIGS. 10 and 11 which illustrate a slight modification of the pivot arm 8, it will be noted that the surface of the cam tongue opposite cam surface 11 is bevelled as at 73. When the pivot arm 8 is mounted as shown in FIG. 10, the action of the arm due to the rotation of drive disc 5 will be identical with that previously discussed.

However, with the provision of the bevelled cam surface 73 it is possible to reverse the arm or mount it upside down as shown in FIG. 11. With the arm mounted as shown in FIG. 11, the pin 7 will first contact and ride along the surface 73 resulting in a pivoting of the arm. As pin 7 passes the end of surface 73 the arm will drop until the cam surface 74 contacts the pin 7, and the pin 7 will slowly raise the arm and then slowly lower it as the pin travels along surface 74. The result is that a somewhat different action is imparted to a fishing line controlled by the action of the pivot arm.

The various components of the device can be constructed of any suitable materials, such as magnesium, aluminum or alloys of the two, or various steels including stainless steel, to provide strength with minimum weight.

Also, as discussed above the various components can be secured to the motor casing 2 by various means such as by the thumb screws shown to enable compactness and convenience for storing and moving the device, and quick and easy erection at the fishing site.

I claim:
1. A fishing device for automatically playing at least one fishing line, comprising a casing and a motor within the casing and power means to drive the motor, and a drive shaft driven by the motor and projecting outwardly from the casing, a rotating member secured to the drive shaft exteriorly of the casing and a drive pin secured to the rotating member, a pivot arm having inner and outer ends and a cam surface provided thereon, the inner end of the pivot arm being pivotally secured to the casing and the pivot arm having means for detachably securing at least one fishing line adjacent the outer end thereof, and means on the device for securing at least one reel holding a fishing line, the fishing line extending from the reel to the detachably securing means on the pivot arm whereby upon rotation of the rotating means the drive pin contacts the cam surface and imparts a substantially vertical reciprocation to the outer end of the pivot arm to play the fishing line.

2. A device according to claim 1 further comprising a stationary arm projecting outwardly from the device and above the pivot arm and means to detachably secure at least one fishing line to the outer end of the stationary arm.

3. A device according to claim 2 wherein the detachably securing means on the outer end of the stationary arm is a pivotally-mounted spring-loaded arm having an open loop to receive a fishing line, a fishing line extending from a second reel to the detachably securing means on the pivot arm to the open loop caried by the stationary arm.

4. A device according to claim 1 wherein the detachably securing means provided on the pivot arm is a coil spring, and means for mounting the coil spring at one of a number of positions along the length of the pivot arm.

5. A device according to claim 2 further comprising a guide bar secured to the casing, and a vertical slot in the guide bar through which the pivot arm projects.

6. A device according to claim 5 wherein the stationary arm is secured to the guide bar.

7. A device according to claim 1 further comprising means to mount a fishing rod and reel on the device.

8. A device according to claim 1 further comprising signal means to indicate when a fish has struck the fishing line.

9. A device according to claim 8, the signal means comprising a flag staff pivoted to the guide bar and means to maintain the flag staff in a non-vertical position prior to the fishing line being struck by a fish.

10. A device according to claim 1 further comprising a support stand for the device, the stand being adjustable to hold the device in upright position for still fishing, or in inclined position for trolling.

11. A fishing device according to claim 1 wherein said pivot arm is reversibly mounted on the casing and wherein the pivot arm is provided with two cams surfaces.

References Cited

UNITED STATES PATENTS

| 2,643,478 | 6/1953 | Paulsen | 43—19.2 |
| 2,861,378 | 11/1958 | Bell | 43—19.2 |
| 2,934,849 | 5/1960 | Kampa | 43—17 |
| 3,031,790 | 5/1962 | Duryea | 43—19.2 |
| 3,190,026 | 6/1965 | Roszak | 43—17 |

SAMUEL KOREN, Primary Examiner

D. J. LEACH, Assistant Examiner

U.S. Cl. X.R.

43—19.2, 21.2, 26.1; 248—158; 287—14